(12) United States Patent
Seo

(10) Patent No.: US 9,789,879 B2
(45) Date of Patent: Oct. 17, 2017

(54) VEHICLE SPEED SIGNAL SELECTION METHOD AND VEHICLE SPEED SIGNAL ADJUSTMENT VERIFICATION METHOD

(71) Applicants: Hyundai Motor Company, Seoul (KR); Kia Motors Corporation, Seoul (KR)

(72) Inventor: Yoo-Jin Seo, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 16 days.

(21) Appl. No.: 14/717,097

(22) Filed: May 20, 2015

(65) Prior Publication Data

US 2016/0144866 A1    May 26, 2016

(30) Foreign Application Priority Data

Nov. 20, 2014 (KR) ........................ 10-2014-0162728

(51) Int. Cl.
| | |
|---|---|
| *B60W 50/02* | (2012.01) |
| *B60W 50/04* | (2006.01) |
| *H04L 12/46* | (2006.01) |
| *B60W 50/00* | (2006.01) |
| *H04L 12/40* | (2006.01) |

(52) U.S. Cl.
CPC ...... *B60W 50/0205* (2013.01); *B60W 50/045* (2013.01); *H04L 12/4633* (2013.01); *B60W 2050/0045* (2013.01); *B60W 2520/10* (2013.01); *B60W 2520/28* (2013.01); *H04L 2012/40215* (2013.01)

(58) Field of Classification Search
CPC ........................ B60W 40/105; B60R 16/023
See application file for complete search history.

(56) References Cited

U.S. PATENT DOCUMENTS

| | | | |
|---|---|---|---|
| 6,044,205 A * | 3/2000 | Reed .................. | G06Q 30/0601 707/999.001 |
| 8,839,666 B2 | 9/2014 | Fujii et al. | |
| 8,862,355 B2 * | 10/2014 | Gibson ................. | B60W 10/06 123/1 A |
| 9,008,854 B2 * | 4/2015 | Breed .................... | G01C 21/26 701/1 |

FOREIGN PATENT DOCUMENTS

| | | |
|---|---|---|
| JP | 5047822 B2 | 7/2012 |
| KR | 10-0196352 B1 | 6/1999 |
| KR | 10-0712810 B1 | 4/2007 |
| KR | 10-1008375 B1 | 7/2011 |

* cited by examiner

*Primary Examiner* — Jelani Smith
(74) *Attorney, Agent, or Firm* — Morgan, Lewis & Bockius LLP

(57) ABSTRACT

A vehicle speed signal adjustment verification method may include an accelerator and vehicle speed change measuring step to obtain a change of an accelerator pedal sensor and a vehicle speed change calculated by an engine control unit, a change comparing step to determine whether the change of the vehicle speed calculated by the engine control unit is within a predetermined range as compared with the change of the accelerator pedal sensor, and a vehicle speed signal changing step to change a vehicle speed signal inputted into the engine control unit, if it is determined that the change of the vehicle speed calculated by the engine control unit is not within the predetermined range as compared with the change of the accelerator pedal sensor.

10 Claims, 6 Drawing Sheets

VEHICLE SPEED SIGNAL SELECTION METHOD AND VEHICLE SPEED SIGNAL ADJUSTMENT VERIFICATION METHOD

CROSS-REFERENCE TO RELATED APPLICATION

The present application claims priority of Korean Patent Application Number 10-2014-0162728 filed on Nov. 20, 2014, the entire contents of which are incorporated herein for all purposes by this reference.

BACKGROUND OF INVENTION

Field of Invention

The present invention relates to a vehicle speed selection method, and, particularly, to a vehicle speed selection method which may calculate a vehicle speed by receiving a vehicle speed signal of a vehicle speed sensor generation unit which satisfies a corresponding condition by checking a CAN communication state between an engine control unit and an ABS control unit, a communication state between the engine control unit and a wheel speed sensor, a confirmation on an exhaust gas emission regulation-applied target of the engine control unit and a confirmation on an automatic transmission-applied vehicle.

In addition, the present invention relates to a vehicle speed signal adjustment verification method, and particularly, to a vehicle speed signal adjustment verification method wherein whether or not the change in a vehicle speed calculated by the engine control unit is within a predetermined range, is determined as compared with the change of an accelerator pedal sensor, thus automatically changing the vehicle speed inputted into the engine control unit in a case where the change is not within the predetermined range.

Description of Related Art

Small- or middle-sized vehicles partially except for large-sized vehicles are using various vehicle speed detection sensors so as to calculate the speeds of the vehicles depending on a sale region or a displacement volume of the vehicle.

In the method for calculating the speed of a vehicle using a vehicle speed detection sensor, there may be a method of using a wheel speed sensor (WSS), a method of using a vehicle speed sensor (VSS), a method of using an ABS digital output, a method of using an ABS CAN message, and a method of using a transmission control unit output.

The method for calculating the speed of a vehicle using the wheel speed sensor (WSS) may be characterized in that the rotations of the wheels of a vehicle are measured using a hall sensor configured to count the rotations of the teeth (47 teeth/1 revolution) of a tone wheel secured to the wheels of the vehicle, and the engine control unit (ECU) receives the measured value, thus calculating the speed of the vehicle. Namely, the method for calculating the speed of a vehicle using the wheel speed sensor is directed to calculating the speed of a vehicle using the wheel speed sensor (WSS) which is configured to recognize 47 pulses per revolution of the wheel of the vehicle.

The method for calculating the speed of a vehicle using the vehicle speed sensor (VSS) is directed to measuring the revolution of the gear of a vehicle transmission using the vehicle speed sensor (VSS) configured to recognize 4 pulses per revolution of the vehicle transmission, so the engine control unit (ECU) may calculate the speed of the vehicle by receiving the measured value. Namely, the method for calculating the speed of a vehicle using the vehicle speed sensor is directed to calculating the speed of a vehicle using the vehicle speed sensor (VSS) which is able to recognize 4 pulses per revolution of the gear of the transmission. Here, the vehicle speed sensor may be a deceleration gear type sensor connected to the gear inside of the vehicle transmission.

The method for calculating the speed of a vehicle using the ABS digital output is characterized in that the anti-lock brake system (ABS) control unit transmits the signal of the wheel speed sensor (WSS) received from each wheel, to the engine control unit (ECU) so as to control the speed and posture of the vehicle, and the engine control unit (ECU) may calculate the speed of the vehicle using the received signal. Namely, the method for calculating the speed of a vehicle using the ABS digital output is directed to calculating the speed of a vehicle by receiving, from the ABS control unit, the value of the wheel speed sensor which is able to recognize 47 pulses per revolution of the vehicle wheel.

The method for calculating the speed of a vehicle using the ABS CAN message is characterized in that the signal of the wheel speed sensor (WSS) that the anti-lock brake system (ABS) control unit receives so as to control the speed of the vehicle and the posture of the vehicle is transmitted in the form of a CAN communication message to the engine control unit (ECU) based on a CAN communication, and the engine control unit (ECU) calculates the speed of the vehicle using the received signal. Namely, the method for calculating the speed of the vehicle using the ABS CAN message is directed to calculating the speed of the vehicle by receiving in the form of the CAN communication message the value of the wheel sensor which is able to recognize 47 pulses per revolution of the wheel of the vehicle, from the ABS control unit.

The method for calculating the speed of a vehicle using the TCU output (Transmission Control Unit Output) is characterized in that the transmission control unit (TCU) measures 4 pulses per revolution of the gear of the transmission using two pulse generator signals in the automatic transmission with respect to the revolutions of the gear inside of the automatic transmission, and the engine control unit (ECU) calculates the speed of the vehicle by receiving the measured value from the transmission control unit (TCU). Namely, the method for calculating the speed of the vehicle using the transmission control unit (TCU) output is directed to calculating the speed of the vehicle by receiving from the TCU a signal value 401 which is able to recognize 4 pulses per revolution of the gear of the transmission.

According to the conventional method for calculating the speed of the vehicle, the engine control unit (ECU) may calculate the speed of the vehicle based on any one of the above-described five methods depending on the vehicle option such as a sale region or the displacement volume. However, there is a problem in that the five methods may need different engine control units (ECU) and vehicle circuit wire connection depending on the options of the vehicle, so when assembling the vehicle or in a case of the after sale service based on the options of the vehicle, the speed of the vehicle may not be correctly measured because of possible errors in the circuit wiring of the vehicle or possible errors in application of the engine control unit.

For example, in a case where the engine control unit (ECU) using the method (method for calculating the speed of an automatic transmission vehicle) for calculating the speed of the vehicle using the transmission control unit output is installed at the automatic transmission vehicle, there may occur a problem in that the speed of the automatic transmission vehicle may not be properly measured. In addition, in a case where the engine control unit (ECU)

using the method for calculating the speed of the vehicle using the wheel speed sensor (WSS) is used for a vehicle which has a vehicle circuit wire connection to which the vehicle speed sensor (VSS) is applied, there may occur a problem in that the speed of the vehicle to which the vehicle speed sensor (VSS) is applied, may not be correctly measured.

Therefore, it needs to develop a vehicle speed selection and vehicle speed signal adjustment verification method which makes it possible for the engine control unit (ECU) to accurately calculate the speed of the vehicle by any one of the above-mentioned five methods.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to a vehicle speed selection method which may calculate a vehicle speed by receiving a vehicle speed signal of a vehicle speed sensor generation unit which satisfies a corresponding condition by checking a CAN communication state between an engine control unit and an ABS control unit, a communication state between the engine control unit and a wheel speed sensor, a confirmation on an exhaust gas emission regulation-applied target of the engine control unit and a confirmation on an automatic transmission-applied vehicle.

In addition, various other aspects of the present invention are directed to a vehicle speed signal adjustment verification method, wherein whether or not the change of a vehicle speed calculated by the engine control unit is within a predetermined range, is determined as compared with the change of an accelerator pedal sensor, thus automatically changing the vehicle speed inputted into the engine control unit in a case where the change is not within the predetermined range.

To achieve the above and/or other objects, there is provided a vehicle speed selection method, which may include: determining, in a CAN communication checking step, whether all control units of a vehicle receive a CAN communication message, and an engine control unit receives the CAN communication message from an ABS control unit; determining, in a wheel speed sensor checking step, whether the engine control unit receives a vehicle speed signal of a wheel speed sensor from a wheel speed sensor, if it is determined that all the control units of the vehicle do not receive the CAN communication message or the engine control unit does not receive the CAN communication message from the ABS control unit; determining, in an emission regulation checking step, whether the engine control unit is meant for receiving the vehicle speed signal of the wheel speed sensor from the wheel speed sensor, if it is determined that the engine control unit does not receive the vehicle speed signal of the wheel speed sensor; and determining, in a transmission checking step, whether the vehicle is an automatic transmission vehicle, if it is determined that the engine control unit is not meant for receiving the vehicle speed signal of the wheel speed sensor.

The vehicle speed selection method may further include: performing an ABS speed data receiving step wherein the engine control unit receives a vehicle speed signal of the ABS control unit from the ABS control unit, if it is determined in the CAN communication checking step that all the control units of the vehicle receive the CAN communication message, and the engine control unit receives the CAN communication message from the ABS control unit.

The vehicle speed selection method may further include: performing a wheel speed data receiving step wherein the engine control unit receives the vehicle speed signal of the wheel speed sensor from the wheel speed sensor, if it is determined in the wheel speed sensor checking step that the engine control unit receives the vehicle speed signal of the wheel speed sensor from the wheel speed sensor.

The vehicle speed selection method may further include: performing a wiring error display step to generate a wiring error signal of the wheel speed sensor, if it is determined in the emission regulation checking step that the engine control unit is meant for receiving the vehicle speed signal of the wheel speed sensor.

The vehicle speed selection method may further include: performing a transmission data receiving step wherein the engine control unit receives a vehicle speed signal of the transmission control unit from the transmission control unit, if it is determined in the transmission checking step that the vehicle is the automatic transmission vehicle.

The vehicle speed selection method may further include: performing a vehicle speed data receiving step wherein the engine control unit receives the vehicle speed signal of the vehicle speed sensor from the vehicle speed sensor, if it is determined in the transmission checking step that the vehicle is not the automatic transmission vehicle.

In the ABS speed data receiving step, the engine control unit receives the vehicle speed signal of the wheel speed sensor from the ABS control unit through a digital input unit of the engine control unit. In the wheel speed data receiving step, the engine control unit receives the vehicle speed signal of the wheel speed sensor from the wheel speed sensor through an analog input unit of the engine control unit. In the transmission data receiving step, the engine control unit receives the vehicle speed signal of the transmission control unit from the transmission control unit through the digital input unit of the engine control unit. In the vehicle speed data receiving step, the engine control unit receives the vehicle speed signal of the vehicle speed sensor from the vehicle speed sensor through the digital input unit of the engine control unit.

To achieve the above and/or other objects, there is provided a vehicle speed adjustment verification method, which may include: obtaining, in an accelerator and vehicle speed change measuring step, a change of an accelerator pedal sensor and a vehicle speed change calculated by an engine control unit; determining, in a change comparing step, whether the change of the vehicle speed calculated by the engine control unit is within a predetermined range as compared with the change of the accelerator pedal sensor; and changing, in a vehicle speed signal changing step, a vehicle speed signal inputted into the engine control unit, if it is determined that the change of the vehicle speed calculated by the engine control unit is not within the predetermined range as compared with the change of the accelerator pedal sensor.

The vehicle speed adjustment verification method may further include: performing a normal wiring display step to display that there is not any error in the wiring between an ABS control unit, a wheel speed sensor, a vehicle speed sensor or a transmission control unit and the engine control unit, if it is determined in the change comparing step that the change of the vehicle speed calculated by the engine control unit is within a predetermined range as compared with the change of the accelerator penal sensor.

In addition, the vehicle speed changing step may include: a vehicle speed down step to decrease the vehicle speed signal inputted into the engine control unit, if the change of the vehicle speed calculated by the engine control unit is not within the predetermined range as compared with the change of the accelerator pedal sensor; and a vehicle speed up step to increase the vehicle speed signal inputted into the engine control unit, if the change of the vehicle speed calculated by the engine control unit is within the predetermined range as compared with the change of the accelerator pedal sensor.

The methods and apparatuses of the present invention have other features and advantages which will be apparent from or are set forth in more detail in the accompanying drawings, which are incorporated herein, and the following Detailed Description, which together serve to explain certain principles of the present invention.

Advantageous Effects

In the vehicle speed signal selection method according to the present invention, since it is possible to accurately calculate the speed of the vehicle in such a way that the engine control unit may accurately distinguish the CAN communication state between an engine control unit and an ABS control unit, the communication state between the engine control unit and a wheel speed sensor, the confirmation on an exhaust gas emission regulation-applied target of the engine control unit and the confirmation on an automatic transmission-applied vehicle, any possible error operation of the engine control unit may be easily prevented, and the inventory management-related cost of the engine control unit reserved for exchanging the engine control with errors may be significantly reduced.

In addition, according to the vehicle speed signal adjustment verification method of the present invention, it is possible to easily verify the confirmation on any error in the wiring between the engine control unit and the vehicle speed generation unit.

DETAILED DESCRIPTION

Figure 1:
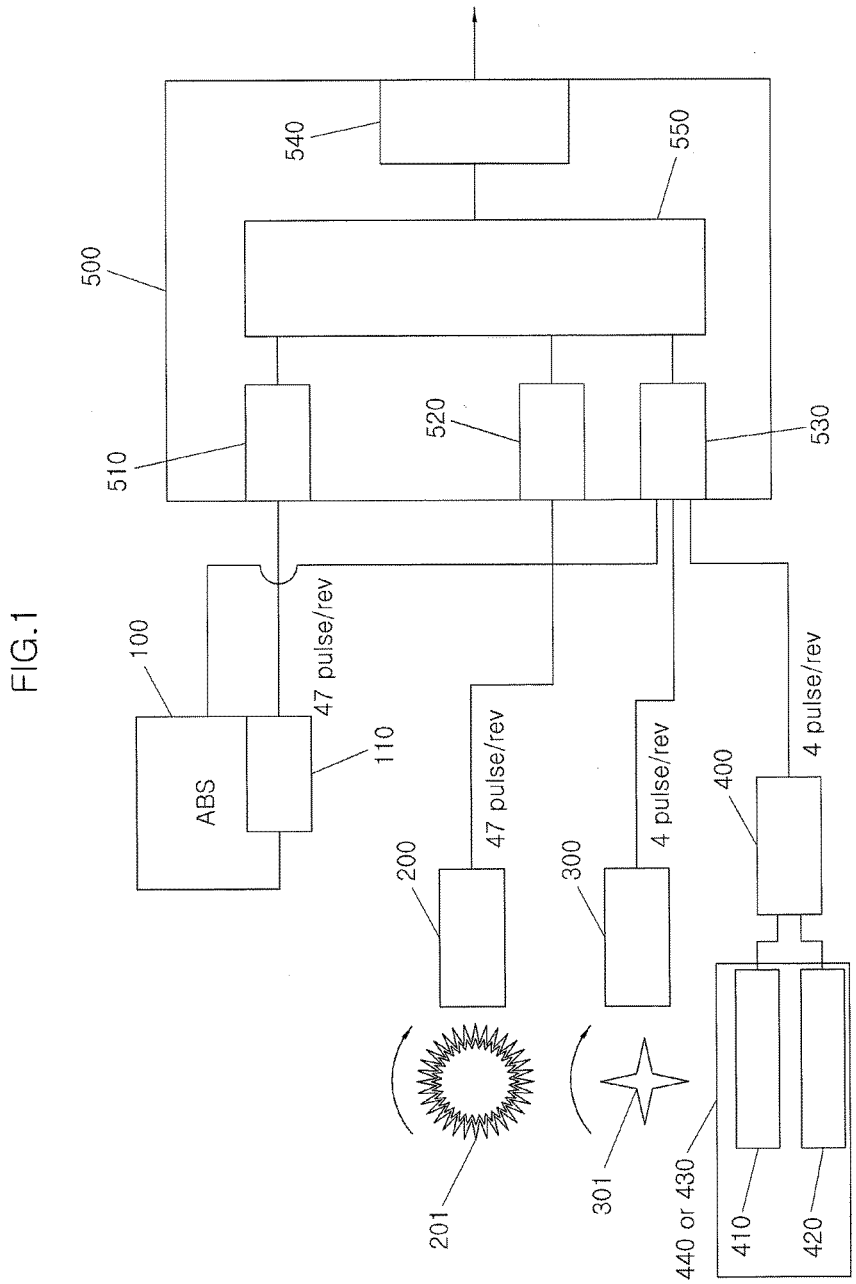
FIG. 1 is a block diagram illustrating an exemplary circuit wiring for a vehicle speed signal selection and vehicle speed signal adjustment verification method according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terms and words used in the specification and claims should not be construed as their ordinary or dictionary sense. On the basis of the principle that the inventor can define the appropriate concept of a term in order to describe his/her own invention in the best way, it should be construed as meaning and concepts for complying with the technical idea of the present invention. Accordingly, the embodiments described in the present specification and the construction shown in the drawings are nothing but one preferred embodiment of the present invention, and it does not cover all the technical ideas of the invention. Thus, it should be understood that various changes and modifications may be made at the time of filing the present application. In addition, detailed descriptions of functions and constructions well known in the art may be omitted to avoid unnecessarily obscuring the gist of the present invention. Exemplary embodiments of the present invention will be described below in more detail with reference to the accompanying drawings.

Hereinafter, exemplary embodiments of the vehicle speed signal selection method according to the present invention will be described with reference to the accompanying drawings.

Figure 2:
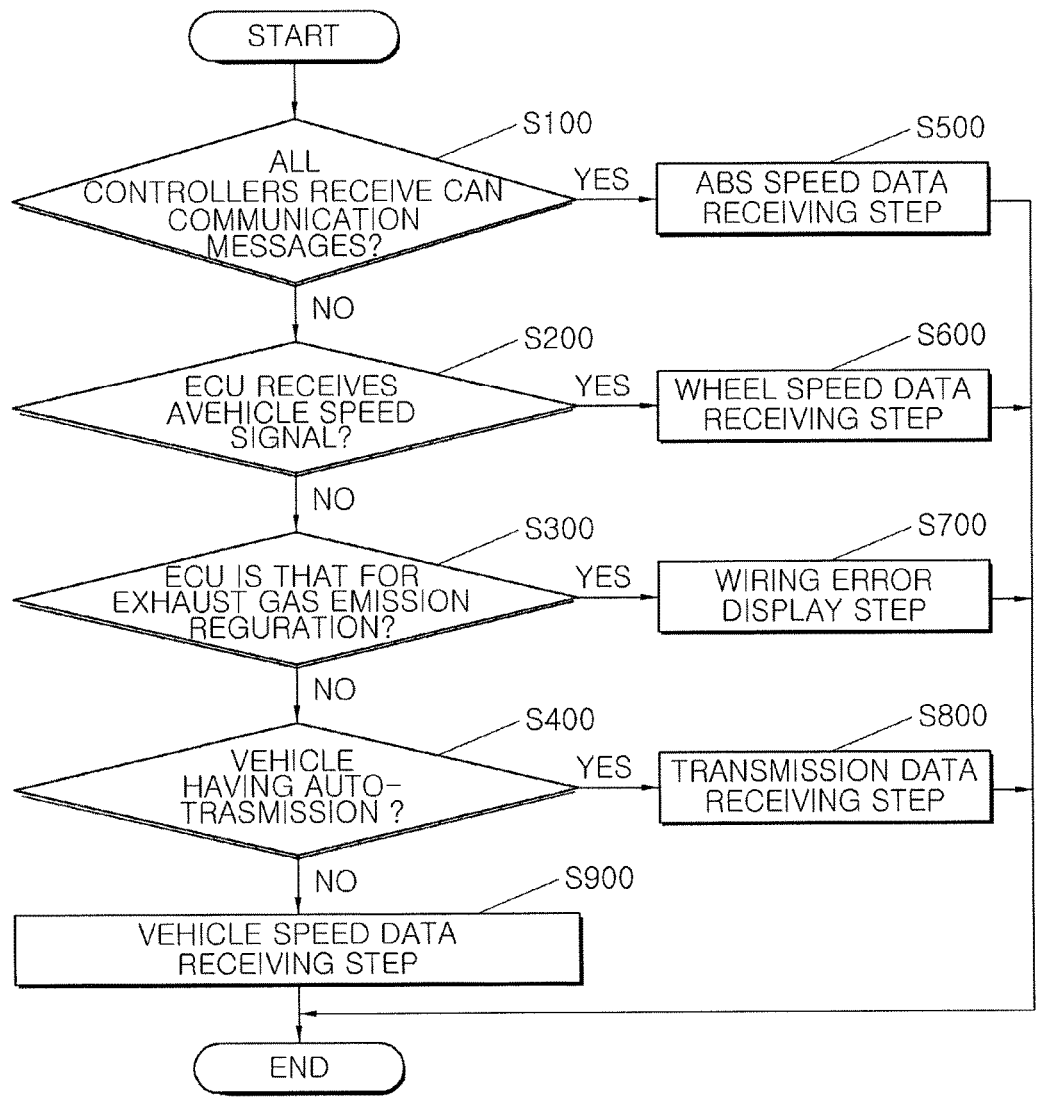
FIG. 2 is a flow chart illustrating a vehicle speed signal selection method according to a first exemplary embodiment of the present invention.
Figure 5A:
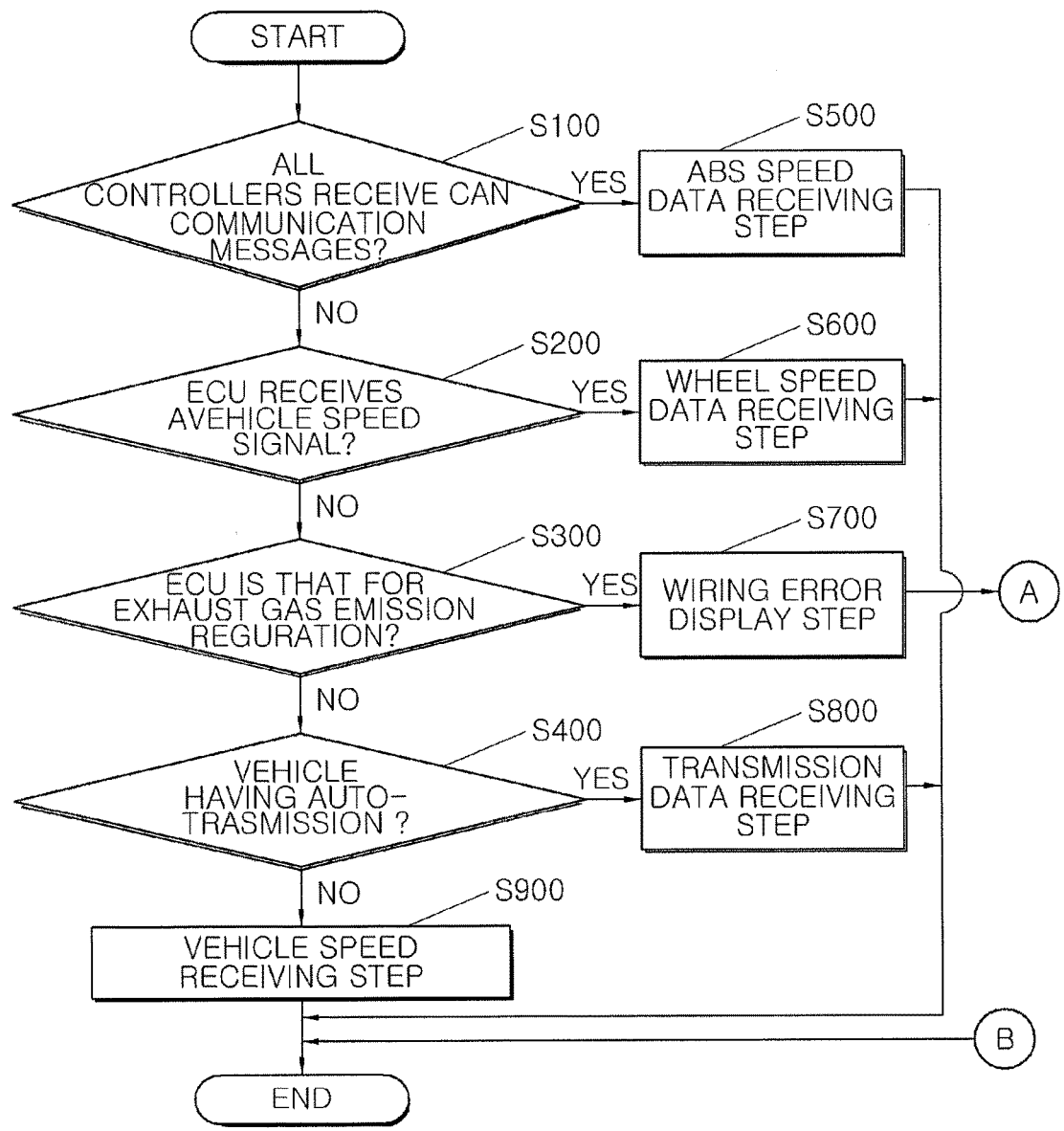
FIG. 5A and FIG. 5B are flow charts illustrating a vehicle speed signal selection method according to a second exemplary embodiment of the present invention.
Figure 5B:
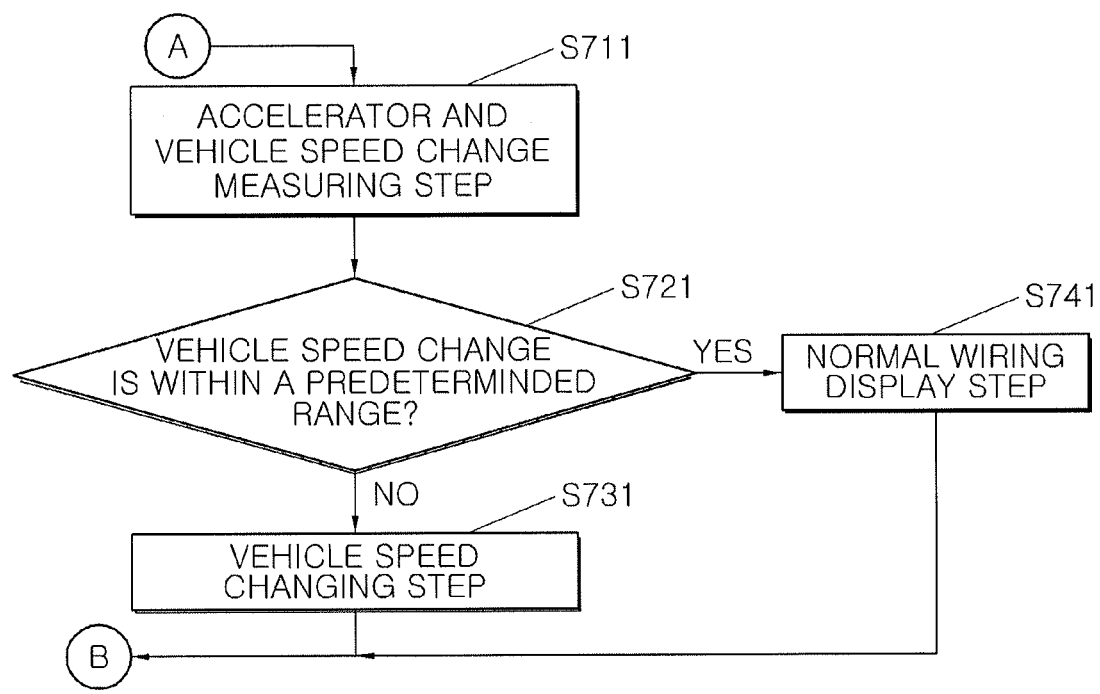

FIG. 1 is a block diagram illustrating a circuit wiring for a vehicle speed signal selection and vehicle speed signal adjustment verification method according to some embodiments of the present invention, FIG. 2 is a flow chart illustrating a vehicle speed signal selection method according to a first exemplary embodiment of the present invention, and FIG. 5A and FIG. 5B are flow charts illustrating a vehicle speed signal selection method according to a second exemplary embodiment of the present invention.

Referring to FIGS. 1, 2, 5A and 5B, the vehicle speed signal selection method according to an exemplary embodiment of the present invention may include a CAN communication checking step S100, a wheel speed sensor checking step S200, an emission regulation checking step S300, a transmission checking step S400, an ABS speed data receiving step S500, a wheel speed data receiving step S600, a wiring error display step S700, a transmission data receiving step S800, and a vehicle speed data receiving step S900.

In the CAN communication checking step S100, it is determined that all the control units of the vehicle receive a CAN communication message, and a CAN receiving unit 510 of the engine control unit 500 receives a CAN communication message from a CAN sending unit 110 of the ABS control unit 100. More specifically, in the CAN communication checking step S100, it is possible to determine whether or not the CAN communication state of the vehicle is normal since all the control units of the vehicle performing the CAN communication receive the CAN communication message and whether or not the CAN communication state is normal between the CAN receiving unit 510 of the engine control unit 500 and the CAN sending unit 110 of the ABS control unit 100 since the engine control unit 500 receives the CAN communication message from the ABS control unit 100.

In this way, the reason why whether or not the CAN communication state in the vehicle is normal, is checked is that in a case where the CAN communication in the vehicle is normal, the engine control unit 500 may receive a vehicle speed signal of the vehicle from the ABS control unit 100. In addition, the engine control unit 500 may calculate the speed of the vehicle using a vehicle speed signal of the vehicle received from the ABS control unit 100. Here, all the control units may represent all the control units in the vehicle which perform a CAN communication, respectively.

In the wheel speed sensor checking step S200, in a case where all the control units of the vehicle don't receive the CAN communication message or the engine control unit (ECU) 500 doesn't receive the CAN communication message, it is determined whether or not the engine control unit (ECU) 500 receives a vehicle speed signal of the wheel speed sensor from the wheel speed sensor 200.

More specifically, in the wheel speed sensor checking step S200, in a case where the CAN communication state in the vehicle is not normal, it is possible to determine whether or not the engine control unit 500 is in a state where to receive a vehicle speed signal from the wheel speed sensor 300, namely, whether or not the communication state from the wheel speed sensor 200 to the engine control unit 500 is normal.

In this way, the reason why whether or not the communication state from the wheel speed sensor 200 to the engine control unit 500 is normal, is checked is that in a case where the communication state from the wheel speed sensor 200 is normal, the engine control unit 500 may receive a vehicle speed signal from the wheel speed sensor 200. In addition, a controller 550 of the engine control unit 500 may calculate the speed of the vehicle using the vehicle speed signal from the wheel speed sensor 200.

In the emission regulation checking step S300, in a case where the engine control unit (ECU) 500 doesn't receive a vehicle speed signal of the wheel speed sensor from the wheel speed sensor 300, it is determined whether or not the engine control unit (ECU) 500 is an engine control unit which should receive a vehicle speed signal of the wheel speed sensor. Here, the reason why whether or not the engine control unit (ECU) 500 is an engine control unit, which should receive a vehicle speed signal of the wheel speed sensor, is determined is that in a case of the countries where the EURO 3, the exhaust gas emission regulation, is being regulated, the engine control unit 500 should receive a signal from the wheel speed sensor 200 so as to determine a misfire diagnosis exception condition. Therefore, the engine control unit 500 of the vehicle which is expected to be exported to the countries where the EUR 3 is being regulated, must be the engine control unit 500 which may receive the vehicle speed signal of the wheel speed sensor.

More specifically, in the emission regulation checking step S300, in a case where the engine control unit 500 doesn't receive a signal of the wheel speed sensor in the vehicle which is not equipped with the ABS control unit configured to perform the CAN communication or in the vehicle wherein the CAN communication is abnormal, it is possible to determine whether or not the vehicle is being regulated by the EURO 3, the exhaust gas emission regulation.

In addition, the reference for determining whether or not the vehicle is being regulated by the EURO 3, the exhaust gas emission regulation, may be determined by confirming whether or not the engine control unit 500 is an engine control unit which should receive a vehicle speed signal of the wheel speed sensor, which may be also confirmed by confirming the countries where the vehicle equipped with the engine control unit 500 is being regulated by the EURO 3, the exhaust gas emission regulation.

Additionally, since the countries which are not being regulated by the EURO 3, the exhaust gas emission regulation, do not use the wheel speed sensor 200, the engine control unit 500 does not need to receive the vehicle speed signal of the wheel speed sensor.

In the transmission checking step S400, in a case where the engine control unit (ECU) 500 is not the engine control unit 500 which should receive the vehicle speed signal of the wheel speed sensor, it is determined whether or not the above vehicle is a vehicle with an automatic transmission 430. More specifically, in the transmission checking step S400, it is possible to determine whether or not the vehicle with the engine control unit 500 exported to the countries which are not being regulated by the EURO 3, the exhaust gas emission regulation, namely, to the countries which are being regulated by the EURO 2 or lower regulation than the EURO 2, the exhaust gas emission regulation, is the vehicle equipped with the automatic transmission 430.

Here, the reason why whether or not the vehicle is equipped with the automatic transmission 430 should be determined, is that in the countries which are not being regulated by the EURO 3, the vehicle equipped with the automatic transmission 430 is characterized in that the engine control unit 500 is configured to receive a vehicle speed signal from the transmission control unit 400, and in the vehicle equipped with the manual transmission 440, not the automatic transmission 430, the engine control unit 500 is expected to receive a vehicle speed signal from the vehicle speed sensor 300. Namely, in the transmission checking step S400, in a case where the engine control unit 500 is not the engine control unit 500 of the vehicle which is exported to the countries which are being regulated by the EURO 3, the exhaust gas emission regulation, it is determined whether or not the vehicle is the vehicle with the manual transmission 440 or the vehicle with the automatic transmission 430.

In a case where all the control units of the vehicle receive the CAN communication message in the CAN communication checking step S100, and the engine control unit (ECU) 500 receives a CAN communication message from the ABS control unit 100, the engine control unit (ECU) receives a vehicle speed signal of the ABS control unit from the ABS control unit 100. Namely, in the ABS speed data receiving step S500, in a case where the CAN communication state in the vehicle is normal, the engine control unit 500 receives a vehicle speed signal of the ABS control unit, thus calculating the speed of the vehicle using the vehicle speed signal of the BS control unit.

In addition, in the ABS speed data receiving step S500, the engine control unit (ECU) 500 may receive a vehicle speed signal of the ABS control unit from the ABS control unit 100 through the digital input unit 530 of the engine control unit. Here, the vehicle speed signal of the ABS control unit may be the signal that the ABS control unit 100 has changed the vehicle speed signal of the wheel speed sensor received from the wheel speed sensor 200 into a CAN communication message or may be the vehicle speed signal of the wheel speed sensor or may be the signal corresponding to the rotations of the teeth of the tone wheel secured to the wheels of the vehicle, namely, the signal which outputs 47 pulses per revolution of the tone wheel.

In a case where the engine control unit (ECU) 500 in the wheel speed sensor checking step S200 receives a vehicle speed signal of the wheel speed sensor from the wheel speed sensor 200, the engine control unit (ECU) 500 may receive a vehicle speed signal of the wheel speed sensor from the wheel speed sensor 200 in the wheel speed data receiving step S600.

Namely, in the wheel speed data receiving step S600, in a case where the communication from the wheel speed sensor is normal, the engine control unit (ECU) 500 receives a vehicle speed signal of the wheel speed sensor from the wheel speed sensor 200, thus calculating the speed of the vehicle using the vehicle speed signal of the wheel speed sensor. In addition, in the wheel speed data receiving step S600, the engine control unit (ECU) 500 may receive the vehicle speed signal of the wheel speed sensor from the wheel speed sensor 200 through the analog input unit 520 of the engine control unit. Here, the vehicle speed signal of the wheel speed sensor may be the signal corresponding to the rotations of the teeth of the tone wheel secured to the wheels of the vehicle, namely, the signal which outputs 47 pulses per revolution of the tone wheel.

In a case that the engine control unit (ECU) 500 in the emission regulation checking step S300 is the engine control unit 500 which should receive the vehicle speed signal 201 of the wheel speed sensor, a wiring error signal 202 at the wheel speed sensor is generated in the wiring error display step S700.

More specifically, in a case of the engine control unit 500 which doesn't receive the vehicle speed signal of the wheel speed sensor even through the engine control unit 500 is the engine control unit 500 installed at the vehicle which is exported to the countries which are being regulated by the EURO 3, the exhaust gas emission regulation, it is checked whether or not there is a wiring error at the wheel speed sensor 200 by generating a wiring error signal of the wheel speed sensor in the wiring error display step S700.

Namely, after the wiring error display step S700, a vehicle assembling worker may directly check whether or not there is a wiring error at the wheel speed sensor, and it is also possible to check whether or not there is a wiring error at the wheel speed sensor by performing the vehicle speed signal adjustment verification method according to the present invention. In particular, as illustrated in FIG. 5, the vehicle speed signal adjustment verification method according to the present invention may be separately performed after the wiring error display step S700 or may be separately performed after the vehicle speed signal selection method according to the present invention is performed.

In a case where the vehicle has the automatic transmission 430 in the transmission checking step S400, the engine control unit (ECU) 500 receives a vehicle speed signal of the transmission control unit from the transmission control unit 400 in the transmission data receiving step S800.

More specifically, in the transmission data receiving step S800, in a case where the engine control unit 500 is not the engine control unit 500 of the vehicle which is exported to the countries which are being regulated by the EURO 3, the exhaust gas emission regulation, and is equipped with the automatic transmission 430, instead, the engine control unit 500 may receive a vehicle speed signal from the transmission control unit 400.

In addition, in the transmission data receiving step S800, the engine control unit (ECU) 500 may receive a vehicle speed signal of the transmission control unit from the transmission control unit 400 through the digital input unit 530 of the engine control unit. Here, the vehicle speed signal of the transmission control unit is a rotation signal of the automatic transmission gear using the signal of two pulse generators 410 and 420 of the automatic transmission, namely, may be a signal which outputs 4 pulses per revolution of the gear of the automatic transmission.

In a case where the vehicle in the transmission checking step S400 is not the vehicle with the automatic transmission 430, the engine control unit (ECU) 500 may receive a vehicle speed signal of the vehicle speed sensor from the vehicle speed sensor (VSS) 300 in the vehicle speed data receiving step S900.

More specifically, in the vehicle speed data receiving step S900, in a case where the engine control unit 500 is not the engine control unit 500 of the vehicle which is exported to the countries which are being regulated by the EURO 3, the exhaust gas emission regulation, namely, the vehicle is equipped with the manual transmission 440, the engine control unit 500 may receive a vehicle speed signal from the vehicle speed sensor 300.

In addition, in the vehicle speed data receiving step S900, the engine control unit (ECU) 500 may receive a vehicle speed signal of the vehicle speed sensor from the vehicle speed sensor 300 through the digital input unit 530 of the engine control unit. Here, the vehicle speed signal of the vehicle speed sensor may be the rotation signal of the gear of the manual transmission 440, namely, the signal which outputs 4 pulses per revolution of the gear of the manual transmission.

The vehicle speed signal adjustment verification method according to a first exemplary embodiment of the present invention will be described with reference to the accompanying drawings.

Figure 3:
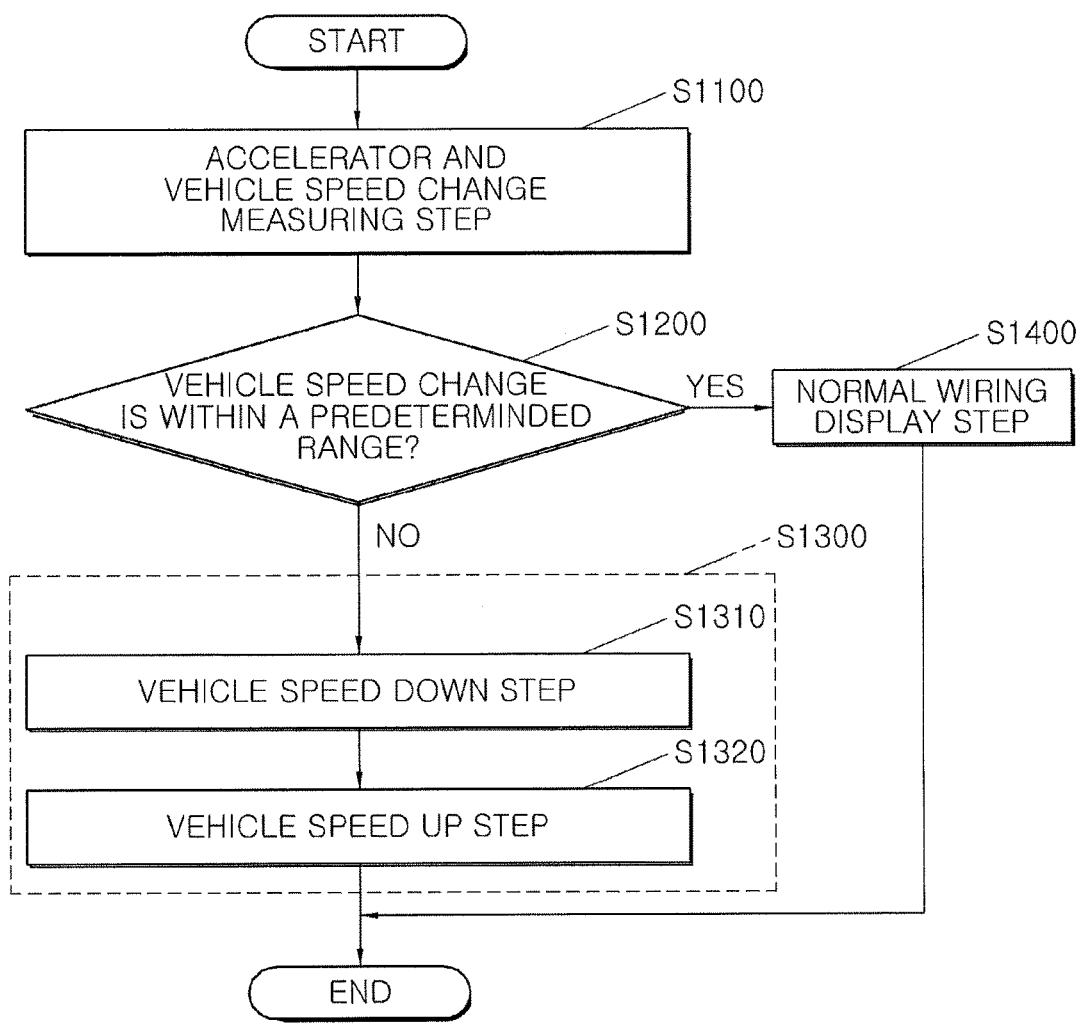
FIG. 3 is a flow chart illustrating a vehicle speed signal adjustment verification method according to a first exemplary embodiment of the present invention.
Figure 4:
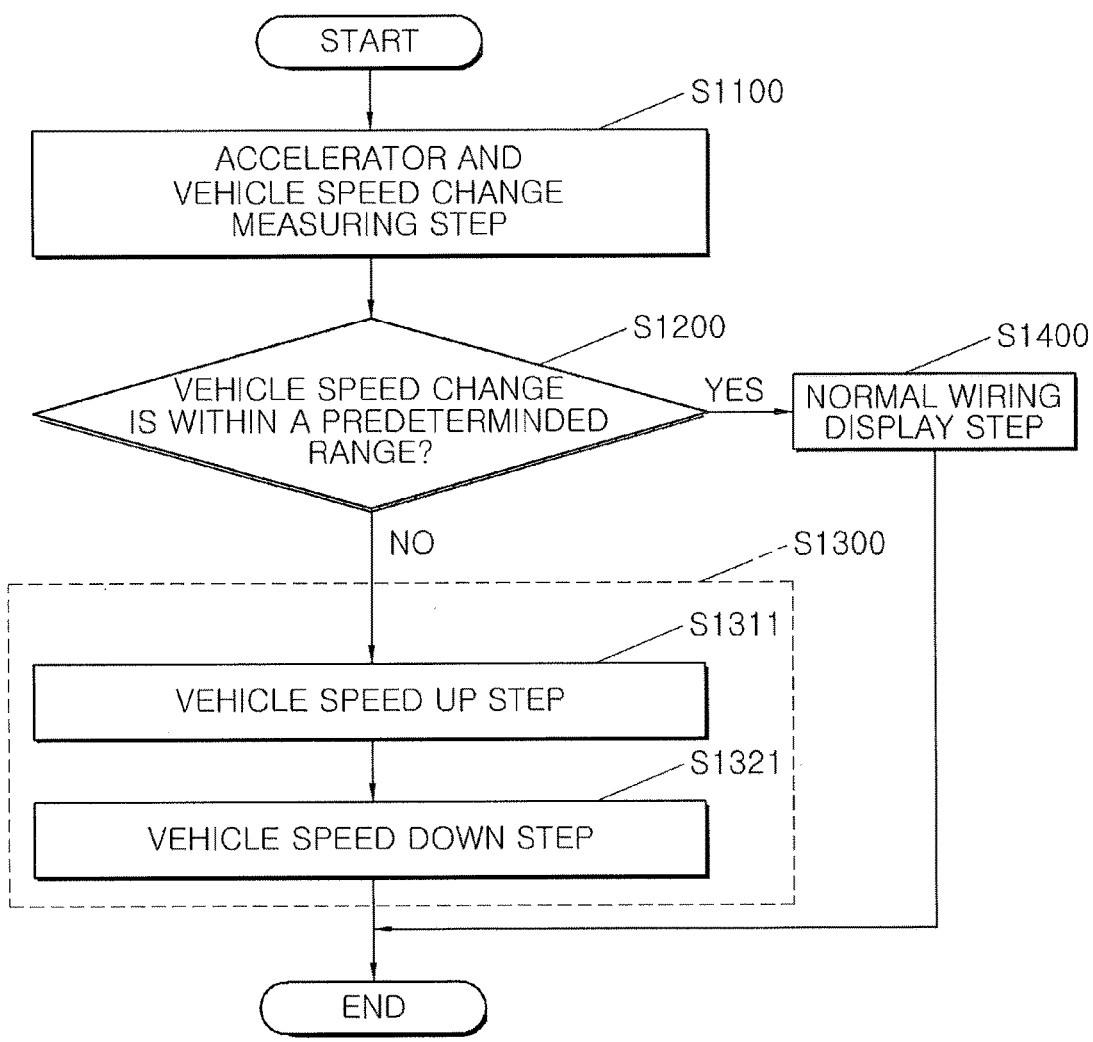
FIG. 4 is a flow chart illustrating a vehicle speed signal adjustment verification method according to a second exemplary embodiment of the present invention.

FIG. 3 is a flow chart illustrating a vehicle speed signal adjustment verification method according to a first exemplary embodiment of the present invention. FIG. 4 is a flow chart illustrating a vehicle speed signal adjustment verification method according to a second exemplary embodiment of the present invention.

Referring to FIGS. 3 and 4, the vehicle speed signal adjustment verification method according to a first exemplary embodiment of the present invention may include an accelerator and vehicle speed change measuring step S1100, a change comparing step S1200, a vehicle speed signal changing step S1300, and a normal wiring display step S1400.

In the accelerator and vehicle speed change measuring step S1100, the change of the accelerator pedal sensor and the change of the vehicle speed calculated the engine control unit are measured. Namely, in the accelerator and vehicle speed change measuring step S1100, the change of the accelerator pedal sensor and the change of the vehicle speed calculated by the engine control unit 500 after the vehicle speed sensor of the vehicle transmits to the engine control unit 500 may be measured. Here, the vehicle speed sensor may be any one of an ABS control unit 100, a wheel speed sensor 200, a vehicle speed sensor 300 or a transmission control unit 400.

In the change comparing step S1200, it is determined whether or not the change of the vehicle speed calculated by the engine control unit is within a predetermined range as compared with the change of the accelerator pedal sensor. More specifically, in the change comparing step S1200, in a case where the wiring states of the vehicle speed sensor and the engine control unit 500 are normal, the change of the vehicle speed calculated by the engine control unit may be within an allowable range of error values about 1 as compared with the change of the accelerator pedal sensor.

However, in a case where the wiring states of the vehicle speed sensor and the engine control unit 500 are not normal, the change of the vehicle speed calculated by the engine control unit may be out of the allowable range of the error values as compared with the change of the accelerator pedal sensor. Here, in a case where the wiring states are normal, it may mean that the vehicle speed from the ABS control unit may be inputted into the digital input unit 530 of the engine control unit or the vehicle speed signal from the wheel speed sensor may be inputted into the analog input unit 520 of the engine control unit or the vehicle speed signal from the vehicle speed sensor may be inputted into the digital input unit 530 of the engine control unit or the vehicle speed signal of the transmission control unit may be inputted into the digital input unit 530 of the engine control unit. Namely, in a case where the wiring states are not normal, it may mean that any one of the above cases is not involved.

At this time, the vehicle speed signal from the ABS control unit may be a tooth rotation signal of the tone wheel 201 engaged to the wheels of the vehicle, namely, may be a signal (47 pulses per revolution) which may output 47 pulses per revolution of the tone wheel. In addition, the vehicle speed signal from the wheel speed sensor may be a tooth rotation signal of the tone wheel engaged to the wheels of the vehicle, namely, may be a signal (47 pulses per revolution) which may output 47 pulses per revolution of the tone wheel.

In addition, the vehicle speed signal from the vehicle speed sensor may be a rotation signal of the gear 301 of the manual transmission, namely, may be a signal (4 pulses per revolution) which outputs 4 pulses per revolution of the gear 301 of the manual transmission. The vehicle speed signal of the transmission control unit may be a rotation signal of the gear of the automatic transmission using the signals of two pulse generators 410 and 420 of the automatic transmission, namely, may be a signal (4 pulses per revolution) which may output 4 pulses per revolution of the gear 301 of the automatic transmission. Namely, in a case where the wiring states are not normal, it may mean that the wiring is connected in such a way that the vehicle speed wherein the engine control unit 500 receives 4 pulses per revolution or the vehicle speed signal of the transmission control unit wherein the engine control unit 500 receives 4 pulses per revolution may be substituted with the vehicle speed signal of the ABS control unit which receives 47 pulses per revolution and the vehicle speed signal of the wheel speed sensor which receives 47 pulses per revolution.

In this case, the change of the vehicle speed calculated by the engine control unit may minimally be about 1/12 and maximally 12 as compared with the change of the accelerator pedal sensor. Namely, in a case where the engine control unit 500 which recognizes the vehicle speed signal based on 4 pulses per revolution recognizes the vehicle speed signal of 47 pulses per revolution, it may mean that the vehicle speed signal of about 12 times may be recognized, so the speed of the vehicle calculated by the engine control unit 500 may derive a vehicle speed which may be calculated about 12 times as compared with the normal speed of the vehicle.

In addition, in a case where the engine control unit 500 which recognizes the vehicle speed signal with 47 pulses per revolution, recognizes the vehicle speed signal of 4 pulses per revolution, it may mean that the vehicle speed signal of about 1/10 times may be recognized, so the speed of the vehicle calculated by the engine control unit 500 may derive a vehicle speed calculated about 1/12 times of the normal speed of the vehicle. Therefore, the above predetermined range may be a range of 1/10 to 10 given the error values of the vehicle speed measuring sensor and the calculation error values of the engine control unit and may be determined based on the field test.

In the vehicle speed signal changing step S1300, in a case where the change of the vehicle speed calculated by the engine control unit is not within the predetermined range as compared with the change of the accelerator pedal sensor, the vehicle speed signal inputted into the engine control unit is changed. Namely, in the vehicle speed signal changing step S1300, in a case where the change is not within a predetermined range, and in a case where the vehicle speed signal inputted into the engine control unit is a vehicle speed signal of 4 pulses per revolution, the engine may change the vehicle speed signal to a vehicle speed signal of 47 pulses per revolution.

In addition, in the vehicle speed signal changing step S1300, in a case where the change is not within the predetermined range, and in a case where the vehicle speed signal inputted into the engine control unit is a vehicle speed signal of 47 pulses per revolution, the engine control unit 500 may change the vehicle speed signal into a vehicle speed signal of 4 pulses per revolution. In particular, in a case where the vehicle speed signal adjustment verification method according to the present invention is performed after the wiring error display step S700 in the vehicle speed selection method according to the present invention, the vehicle speed signal may be automatically changed in the vehicle speed signal changing step S1300, so it is possible to resolve the speed display problem due to the error wiring. More particularly, the vehicle speed signal changing step S1300 may include a vehicle speed signal down step S1310, and a vehicle speed signal up step S1320.

In the vehicle speed signal down step S1310, in a case where the change of the vehicle speed calculated by the engine control unit is out of a predetermined range as compared with the change of the accelerator pedal sensor, the vehicle speed signal inputted into the engine control unit decreases. Namely, in the vehicle speed signal down step S1310, in a case where the change is out of the predetermined range, namely, in a case where the change is not within the predetermined range, and in a case where the vehicle speed signal inputted into the engine control unit is a vehicle speed signal of 47 pulses per revolution, the engine control unit 500 may decrease the vehicle speed signal to a vehicle speed signal of 4 pulses per revolution.

However, since the engine control unit 500 is the engine control unit 500 installed at the vehicle which is not being regulated by the EURO 3 regulating the receiving of the vehicle speed signal of 4 pulses per revolution, the engine control unit 500 should receive a vehicle speed signal from the vehicle speed sensor 300 or the transmission control unit 400.

However, since the engine control unit 500 receives a vehicle speed signal of 47 pulses per revolution, error wiring has occurred between the vehicle speed sensor 300 or the transmission control unit 400 and the engine control unit 500. Therefore, the engine control unit 500 decreases, to the normal vehicle speed signal of 4 pulses per revolution, the vehicle speed signal of 47 pulses per revolution which are wrongly inputted because of the error wiring. Here, since the engine control unit may be wrongly wire-connected to another unit, except for the ABS control unit 100 or the wheel speed sensor 200, the above-mentioned predetermined range being out of the predetermined range determined by the engine control unit may be derived through the field tests.

In the vehicle speed signal up step S1320, in a case where the change of the vehicle speed is lower than a predetermined range as compared with the change of the accelerator pedal sensor, the vehicle speed inputted into the engine control unit may be increased.

Namely, in the vehicle speed signal up step S1320, in a case where the change is lower than a predetermined range, namely, in a case where the change is not within a predetermined range, and in a case where the vehicle speed signal inputted into the engine control unit is a vehicle speed signal of 4 pulses per revolution, the engine control unit 500 may increase the vehicle speed signal to a vehicle speed signal of 47 pulses per revolution.

However, since the engine control unit 500 is the engine control unit 500 installed at the vehicle which is being regulated by the EURO 3 receiving the vehicle speed of 47 pulses per revolution, the engine control unit 500 should receive a vehicle speed signal from the ABS control unit 100 or the wheel speed sensor 200.

However, since the engine control unit 500 receives a vehicle speed signal of 4 pulses per revolution, there must be an error wiring connection between the ABS control unit or the wheel speed sensor 200 and the engine control unit 500. Therefore, the engine control unit 500 increases, to a normal vehicle speed signal of 47 pulses per revolution, the vehicle speed signal of 4 pulses per revolution which is wrongly inputted due to the error wiring. Here, since the engine control unit may be wrongly connected to another unit except for the vehicle speed sensor 300 or the transmission control unit 400, the above-mentioned predetermined range lower than the predetermined range determined by the engine control unit 500 may be derived through the field tests.

In the vehicle speed signal adjustment verification method according to the first exemplary embodiment of the present invention, the vehicle speed signal up step S1320 has been performed after the vehicle speed signal down step S1310, but in the vehicle speed signal adjustment verification method according to the second exemplary embodiment of the present invention, the vehicle speed signal down step S1321 may be performed after the vehicle speed signal up step S1311.

In a case where the change of the vehicle speed calculated by the engine control is within a predetermined range in the change comparing step S1200 as compared with the accelerator pedal sensor, it may mean in the normal wiring display step S1400 that there is not any error in the wiring between the wheel speed sensor 200, the vehicle speed sensor 300 or the transmission control unit 400 and the engine control unit 500. Namely, in the normal wiring display step S1400, since that there is not any error in the wiring is displayed only when the change is within a predetermined range, in a case where the vehicle speed signal changing step S1300 is performed without displaying no error in the wiring, it may mean that the vehicle speed signal is automatically changed because of the error in the wiring.

Additionally, referring to FIGS. 5A and 5B, the vehicle speed signal adjustment verification method according to the present invention may be performed after the wiring error display step S700 in the vehicle speed signal selecting method according to the present invention, the engine control unit 500 may calculate the vehicle speed by changing the error signal due to the error in the wiring between the engine control unit 500 and the units 100, 200, 300 and 400 which generate vehicle speed signals S711, S721, S741, S731.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle speed signal selection method, comprising:
   determining, in a communication checking step, whether all control units of a vehicle receive a communication message, and an engine control unit receives the communication message from an ABS control unit;
   determining, in a wheel speed sensor checking step, whether the engine control unit receives a vehicle speed signal of a wheel speed sensor from the wheel speed sensor, when it is determined that all the control units of the vehicle do not receive the communication message or the engine control unit does not receive the communication message from the ABS control unit;
   determining, in an emission regulation checking step, whether the engine control unit is meant for receiving the vehicle speed signal of the wheel speed sensor from the wheel speed sensor, when it is determined that the engine control unit does not receive the vehicle speed signal of the wheel speed sensor; and
   determining, in a transmission checking step, whether the vehicle is an automatic transmission vehicle, when it is determined that the engine control unit is not meant for receiving the vehicle speed signal of the wheel speed sensor.

2. The method of claim 1, further comprising:
   performing an ABS speed data receiving step wherein the engine control unit receives a vehicle speed signal of the ABS control unit from the ABS control unit, when it is determined in the communication checking step that all the control units of the vehicle receive the communication message, and the engine control unit receives the communication message from the ABS control unit.

3. The method of claim 1, further comprising:
   performing a wheel speed data receiving step wherein the engine control unit receives the vehicle speed signal of the wheel speed sensor from the wheel speed sensor, when it is determined in the wheel speed sensor checking step that the engine control unit receives the vehicle speed signal of the wheel speed sensor from the wheel speed sensor.

4. The method of claim 1, further comprising:
   performing a wiring error display step to generate a wiring error signal of the wheel speed sensor, when it is determined in the emission regulation checking step that the engine control unit is meant for receiving the vehicle speed signal of the wheel speed sensor.

5. The method of claim 1, further comprising:
   performing a transmission data receiving step wherein the engine control unit receives a vehicle speed signal of the transmission control unit from the transmission control unit, when it is determined in the transmission checking step that the vehicle is the automatic transmission vehicle.

6. The method of claim 1, further comprising;
   performing a vehicle speed data receiving step wherein the engine control unit receives the vehicle speed signal of the vehicle speed sensor from the vehicle speed sensor, when it is determined in the transmission checking step that the vehicle is not the automatic transmission vehicle.

7. The method of claim 2, wherein in the ABS speed data receiving step, the engine control unit receives the vehicle speed signal of the wheel speed sensor from the ABS control unit through a digital input unit of the engine control unit.

8. The method of claim 3, wherein in the wheel speed data receiving step, the engine control unit receives the vehicle speed signal of the wheel speed sensor from the wheel speed sensor through an analog input unit of the engine control unit.

9. The method of claim 5, wherein in the transmission data receiving step, the engine control unit receives the vehicle speed signal of the transmission control unit from the transmission control unit through the digital input unit of the engine control unit.

10. The method of claim 6, wherein in the vehicle speed data receiving step, the engine control unit receives the vehicle speed signal of the vehicle speed sensor from the vehicle speed sensor through the digital input unit of the engine control unit.

* * * * *